May 30, 1933.  J. W. HARSCH ET AL  1,911,191
SYSTEM OF HEAT TREATMENT
Filed June 26, 1929   2 Sheets-Sheet 1

Inventors
John H. Harsch and
William R. Schofield
Cornelius L. Ehret
their Attorney.

UNITED STATES PATENT OFFICE

JOHN W. HARSCH, OF GWYNEDD, AND WILLIAM R. SCHOFIELD, JR., OF PHILADELPHIA, PENNSYLVANIA, ASSIGNORS TO LEEDS & NORTHRUP COMPANY, OF PHILADELPHIA, PENNSYLVANIA, A CORPORATION OF PENNSYLVANIA

SYSTEM OF HEAT TREATMENT

Application filed June 26, 1929. Serial No. 373,752.

Our invention relates to heat treatment, and more particularly to the determination of a critical stage or stages during the heating or treatment of a heat absorbing material, as steel or an alloy thereof.

In accordance with our invention, the temperature of a heat absorbing material, as a metal whose properties are to be changed by and in accordance with heating thereof, disposed in heat transfer relation with respect to a source of heat, and the temperature of said source are differentially compared with respect to each other, whereby critical stages or transformation periods occurring during heating of said material are sharply and clearly defined.

Further in accordance with our invention, heat treatment on a quantity production basis of a metal having one or more critical stages or transformation periods, as steel, is accomplished by differentially comparing the respective temperatures of a batch of said metal and said source during heating of the metal, at fixed time intervals, to successively determine transformation periods occurring during the treatment; and more particularly said differential temperature is compared to a concurrently determined time-temperature record of said metal to determine the temperature or temperatures of the metal at which said transformation period or periods took place.

Further in accordance with our invention, there is provided means for determining and recording on a uniformly moving chart the difference between the respective temperatures of said source and the metal undergoing treatment, and for concurrently therewith determining and recording on said chart the temperature of said metal whereby the transformation periods occurring during the heating of said metal may be determined either independently of or with reference to the temperature of the metal.

Our invention further resides in a method and apparatus of the character hereinafter described and claimed.

In a patent to Wrighton, No. 1,188,128, June 20, 1916, there is described a method for determining the time of occurrence of critical periods or transformation points of material, such as steel, during heat treatment thereof, and without regard to the particular temperature of the steel itself by reference to the time-temperature record of the steel. This method, while permitting substantially uniform treatment of batches of material, as compared with the method of testing individual samples of the batch for their critical periods, may have under certain conditions the disadvantage that the bend or "hump" in the time-temperature curve, representative of a critical period, is so slight that an accurate determination of the time of occurrence of the critical period is rendered difficult.

In order to accentuate or magnify the size of the "hump" denoting the passage of the material through a critical period, it has previously been the practice to employ a test curve or chart having as its ordinate the temperature of a sample of the material to be treated, and as abscissæ the difference in temperature between the sample and a neutral body, i. e. a body having no critical periods during variation in temperature thereof, which is disposed in heat transfer relation with respect to the sample. Due to the fact that there is an appreciable variation in the difference between the temperatures of the sample and the neutral body during passage of the sample through a critical period, the temperature difference chart will show a pronounced bend or "hump" to indicate the occurrence of such critical period.

The disadvantages of the sample-testing method with respect to uniform quantity production are pointed out in the specification of the aforesaid patent to Wrighton.

That is, a large number of errors may enter into the determination of an average or absolute critical point when individual samples are selected from comparatively large batches of material to be treated, due to variation in the many factors involved.

By our invention, it is possible to uniformly heat treat batches of material on a production basis, as described in the Wrighton patent, and in addition to determine with greater accuracy and facility the occurrence of one or more critical periods through which the material passes during heating thereof.

For an understanding of our invention, reference is had to the accompanying drawings, in which.

Figure 1:
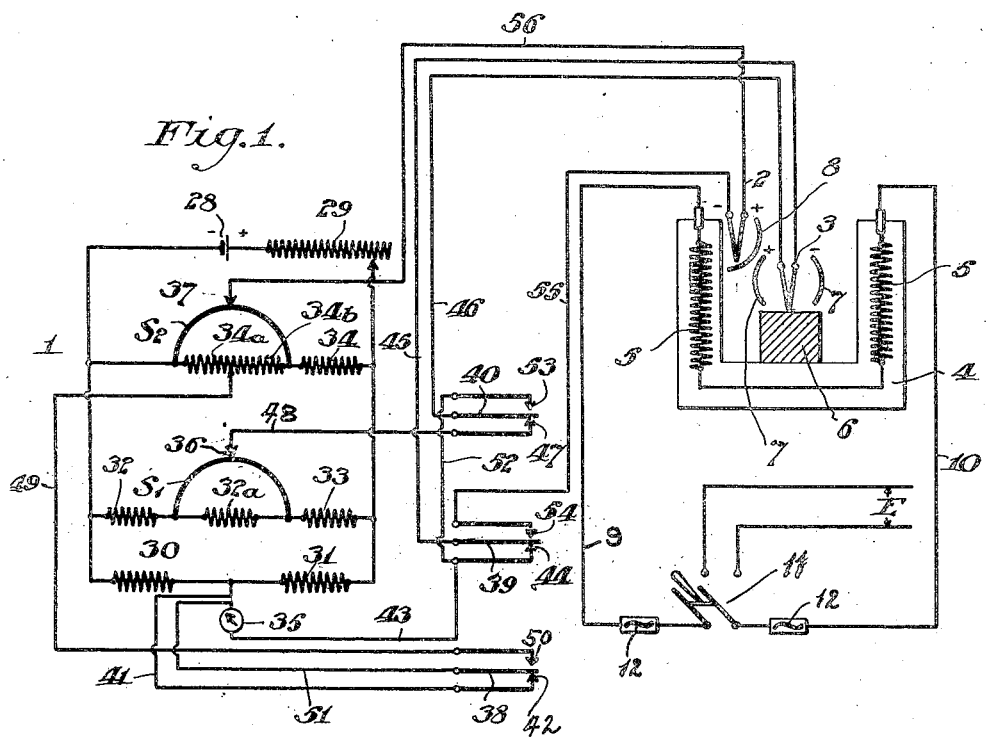
Fig. 1 is a diagrammatic illustration of apparatus embodying our invention.

Referring to Fig. 1, an electrical balancing circuit generally indicated by 1 is connected to a pair of thermo-couples 2 and 3 disposed within a heat treating furnace, or equivalent, 4, in a manner hereinafter described. Furnace 4 is heated by resistor elements 5 traversed by current from a source E. The work 6 within the heating chamber is heated as the surrounding furnace medium is heated by resistor elements 5 and also by radiant heat from said elements. Thermo-couple 3 is disposed in close relation to work 6, and is protected from the radiant heat of the furnace walls by shields 7 of any suitable construction and material so that the temperature indicated thereby will be substantially that of the work 6. Thermo-couple 2 is disposed adjacent a wall of a heating chamber and is therefore solely responsive to the temperature of the heating source. Shield 8 protects thermo-couple 2 from any cooling influence that the work 6 might have on it.

Resistors 5 are connected by conductors 9 and 10 to the power controlling switch 11. When switch 11 is closed, the resistors 5 are connected directly across the source of power E and supply heat at a predetermined rate to the heating chamber. Fuses 12 in conductors 9 and 10 protect the resistors from overload.

Balancing circuit 1 comprises a plurality of balancing networks on circuits, of the potentiometer type, having in common a source of electro-motive-force 28, connected in series with a limiting resistance 29, and a galvanometer 35. One network consists of resistances 30, 31, 32, 32a, slide wire resistance S1 and resistance 33, and the other network consists of resistances 34a, 34b, slide wire resistance S2 and resistance 34. Galvanometer 35 is adapted to be connected by contact mechanism hereinafter described alternately to contacts 36 and 37 cooperating with slide wire resistances S1 and S2, and their corresponding networks respectively.

When galvanometer 35 is connected to the network containing the slide wire S1, thermo-couple 3 will be individually connected in series therewith, and adjustment of contact 36 on slide wire S1 for balance of the network will indicate the temperature of thermo-couple 3 and hence the temperature of work 6. When the galvanometer 35 is connected to slide wire resistance S2 through contact 37 both thermo-couples 2 and 3 will be connected in opposing relation to each other in series in the galvanometer circuit. Since thermo-couple 2 indicates the temperature of the heating source, it will be apparent that the balance of the network by contact 37 will indicate the temperature difference between the work and the heating source. In order to transfer connection of galvanometer 35 and the respective thermo-couples from one network to the other, switches 38, 39 and 40 are utilized, and are periodically operated simultaneously in the same direction so as to close either the upper or lower contacts. When switches 38, 39 and 40 are at their lower position the circuit is completed through conductor 41, contact 42, switch 38, galvanometer 35, conductor 43, contact 44, switch 39, conductor 45, thermo-couple 3, conductor 46, switch 40, contact 47, conductor 48 to contact 36 which cooperates with slide wire resistance S1. When the above switches simultaneously move to their upper position, the circuit is completed from the second network through conductor 49, contact 50, switch 38, conductor 51, galvanometer 35, conductor 43, conductor 52, contact 53, switch 40, conductor 46, to the positive terminal of thermo-couple 3. The negative terminal connects by conductor 45, switch 39, contact 54, conductor 55, to the negative terminal of thermo-couple 2, thereby connecting the thermo-couples 2 and 3 so that the electro-motive forces produced therein oppose each other. The positive terminal of thermo-couple 2 connects through conductor 56, to contact 37 cooperating with slide wire resistance S2.

Figure 2:
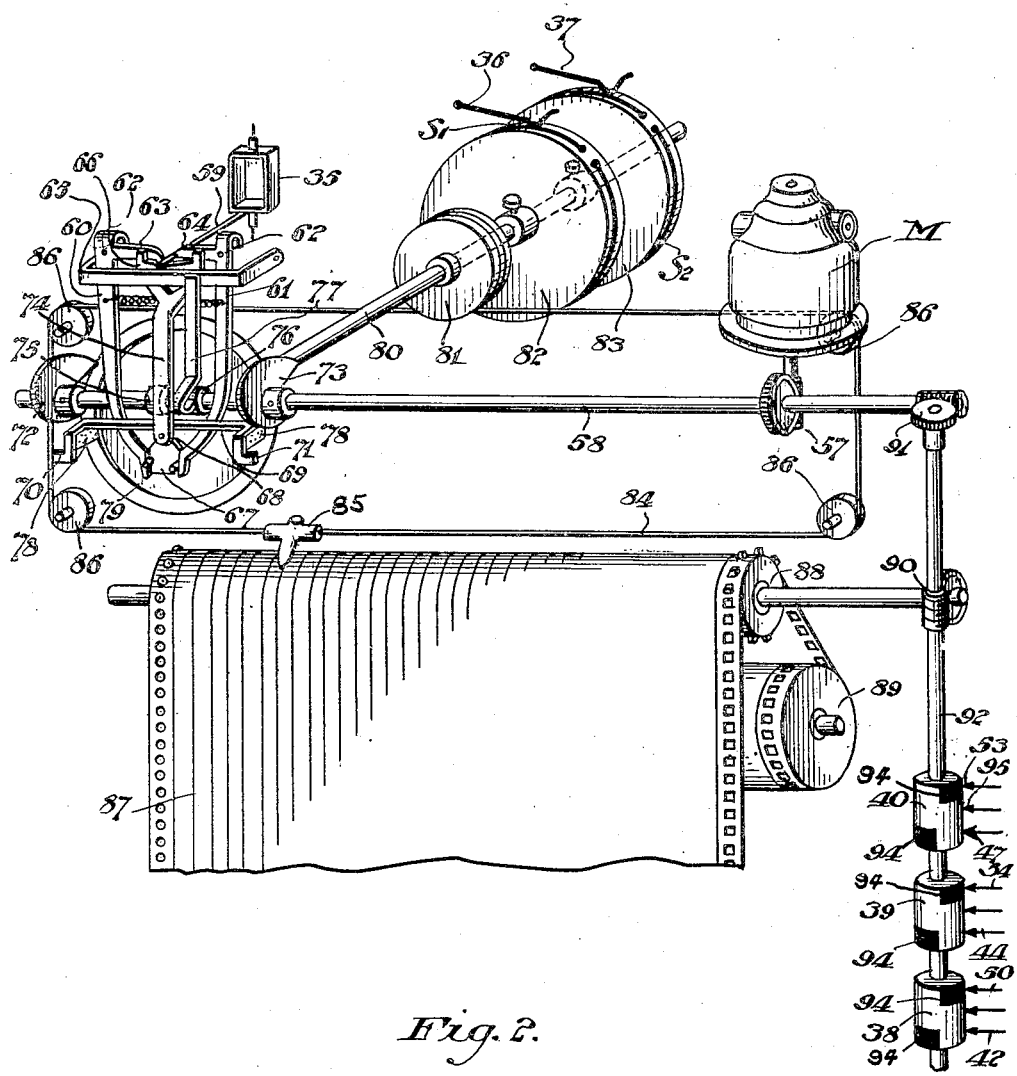
Fig. 2 is a view of automatic recording apparatus.

Referring to Fig. 2, there is shown a control mechanism of the character described in Leeds Patent No. 1,125,699 for automatically balancing the electrical circuits of Fig. 1 and operating the contacting mechanism connected therewith. A constant speed motor M drives through gearing 57 a shaft 58 which actuates a disengageable mechanical connection hereinafter described, and switches 38, 39 and 40. Galvanometer 35 having a pointer or arm 59 secured thereto is adapted to deflect the said arm in either one direction or the other, depending upon the magnitude of the electro-motive-forces produced by the thermo-couples. Members 60 and 61 are pivotally supported at 62 and have extending arms 63 and 64 disposed toward each other having their ends spaced so that member 59 may freely move between them. A pivoted bracket member 65 carries member 66 whose upper edge, which inclines in each direction from its center, is adapted to engage galvanometer arm 59 and move the same into engagement with either extension arm 63 or 64, depending on the deflection of galvanometer 35. In such cases member 60 or 61, as the case may be, will be rotated about its pivot and will rotate plate 67 pivoted at 68. A normally transversely extending member 69 is secured to plate 67 and rotates therewith. Member 69 has at its opposite ends extensions 70 and 71 adapted to be engaged by cams 72, 73 when arm 69 is rotated out of its normal horizontal position. Member 67 is carried by arm 74 which is pivoted at its upper end and adapted to be moved outwardly by cam 75 mounted on shaft 58. Cam 76, mounted on the same shaft also engages arm 77 carried by the pivot bracket member 65 for periodically rotating the same into engagement with galvanometer arm 59. The transversely disposed member 69 has friction elements 78 mounted on the opposite ends thereof for engagement with clutch disc 79. The operation of the disengageable clutch mechanism is as follows:

Shaft 58 which operates at constant speed has cams 75 and 76 mounted thereon so that rotation of member 69 through bracket 65, galvanometer arm 59 and arms 60 and 61, will occur only when cam 75 has rotated arm 74 in an outward direction, thereby disengaging friction members 78 from the clutch disc 79. After friction elements 78 have again come into engagement with clutch disc 79, cam 72 or 73, as the case may be, will engage either extension 70 or 71 or member 69, depending on its position. Clutch engaging member 69 may be biased towards clutch disc 79 by spring (not shown and rotation thereof by cams 72 and 73 will effect rotation of clutch disc 79 in a direction depending upon the deflection of galvanometer arm 59. Rotation of clutch disc 79 also effects rotation of shaft 80 which has mounted thereon recorder actuating pulley 81, discs 82 and 83 having mounted thereon slide wire resistances S1 and S2, respectively. In the present instance, the contacts 36 and 37 cooperating with slide wire resistances S1 and S2 are stationary with respect to the slide wires, although it is immaterial so long as relative movement is effected between them. Pulley 81 mounted on shaft 80 is secured to a cord or other flexible member 84 having attached thereto a recording pen 85. The cord is guided by pulleys 86 so that pen 85 may move longitudinally of the axis of a recorder chart 87 in response to rotative movement of shaft 80. The recorder chart 87 is mounted on drums 88 and 89, drum 88 being driven through suitable gearing 90, 91 and 57 by motor M.

Shaft 92 which actuates the recorder chart also actuates switches 38, 39 and 40. It is evident that the rate of operating the above named switches may be readily varied by interposing suitable gearing between shaft 92 and motor M. For the purposes of illustration, switches 38, 39 and 40 are shown as cylindrical members mounted on shaft 92, having insulating strips 94 mounted on the surface thereof for alternately breaking the circuit between the central contact, which is always in contact with a conducting surface, and the other two contacts. For example, as switch 40 rotates, central contact 95 will alternately be in conducting relation with contact 47 and contact 53. Switches 38 and 39 are so adjusted with respect to switch 40 that three pairs of contacts will be simultaneously bridged by the conducting surfaces of the switches in the manner indicated in Fig. 1.

Figure 3:
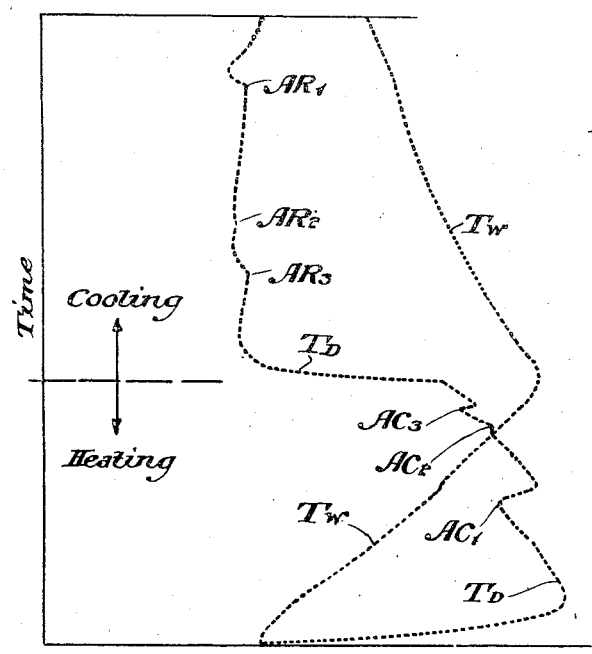
Fig. 3 illustrates a time-temperature chart.

Referring to Fig. 3, there is shown a heating and cooling curve $T_w$, representative of a comparatively low carbon steel. In the present instance, it will be noted that the bends or "humps" in curve $T_w$ are quite difficult to determine, and as a matter of fact the critical periods could only be roughly or approximately determined if curve $T_w$ were solely relied upon.

The temperature difference curve $T_d$, however, indicates several decidedly abrupt changes, or "humps", namely, at times corresponding to temperatures 1310°, 1500°, and 1550° of the steel on curve $T_w$ representative of the decalescence periods or transformation points $AC_1$, $AC_2$ and $AC_3$ respectively. These transformation points are representative of the transformation of pearlite to austenite and of the changes of the excess alpha iron to the beta and gamma forms of the iron respectively, and being well known in the art, further discussion thereof is believed to be unnecessary, except to mention that the transformation point $AC_3$, which represents the change from beta to gamma iron, also indicates a period of appreciable volume change as compared with the other transformation periods and therefore assumes considerable importance in the treatment of low carbon steels. Since the transformation point $AC_3$ cannot be discerned on the curve $T_w$, it is apparent that this curve would be practically useless for heat treating a low carbon steel. Due to the relatively large volume change which takes place when the steel passes through $AC_3$, it is obvious that the operator must know when the metal has passed entirely through and beyond this transformation period in order that the metal shall not be warped or have abnormal stresses set up therein due to quenching, for example, at the wrong time. By referring to curve $T_d$, the actual time of occurrence of a transformation period is determined, and by reference to curve $T_w$, the temperature at which the transformation point occurs may be readily determined. Accordingly, if the steel is to be cooled or quenched within a certain temperature of a critical point, it is simply necessary to locate the said point on curve $T_d$, and by subsequent reference to curve $T_w$, complete the heat treatment as desired.

In the same manner, the critical periods which the steel passes while cooling, as the recalescence periods $AR_3$, $AR_2$ and $AR_1$, may be determined.

The operation of the system is as follows:—

Assuming motor driven shaft 92 to be in such position that thermo-couple 3, which is in contact with work 6, is in the galvanometer circuit, galvanometer 35 will be deflected in a direction depending upon the electro-motive-force produced by thermo-couple 3, said electro-motive-force being representative of the temperature of work 6. As galvanometer arm 59 is deflected in one direction or the other, shaft 80 will be rotated in a corresponding direction through the disengageable clutch mechanism previously described, and slide wire S1 mounted on disc 82 will be adjusted with respect to contact 36 until the potentiometer circuit has arrived at a new balance, which will occur when galvanometer 35 is not deflected and arm 59 is in the space between the extensions of arms 60 and 61. While shaft 80 is rotating slide wire S1 to balance the circuit, the recorder pulley 81 moves recorder pen 85 transversely with respect to chart 87 and so produces a record thereon of the temperature of the work within the heating chamber.

After a predetermined interval of time, switches 38, 39, 40 will have rotated to connect thermo-couples 2 and 3 in opposition to each other in the galvanometer circuit which cooperates with slide wire S2. Since the electro-motive-forces of thermo-couples 2 and 3 are opposed to each other, the resultant electro-motive-force will be representative of the difference between the temperature of the source and the temperature of the work itself. As before, galvanometer 35 will deflect according to the magnitude of the resultant electro-motive-force and will rotate shaft 80 and slide wire resistance S2 through the aforesaid clutch mechanism in such direction as to effect a balance of the circuit.

Although in the present instance the pen 85 is illustrated such that it will be in constant contact with chart 87, it shall be understood that pen lifting means, well known in the art, may be employed in connection with the structure illustrated in Fig. 2 for lifting pen 85 from the chart while it is alternately moving from one curve to the other. Such mechanism is conventionally known as a two-point recorder, and produces the type of curve illustrated in Fig. 3. Leeds Patent 1,125,699 illustrates a multiple-point recorder.

Since the motor M operates to move the chart at substantially uniform speed, the individual curves produced will be a co-existing time-temperature record of the work itself, and a time-temperature difference record with respect to the source and work. Accordingly, the rate of heating, which may have considerable bearing on the treating process, may be readily determined upon inspection of the time-temperature record of the work, which is not possible with a temperature difference curve whose ordinate represents the temperature of the work. The co-existing records on the chart also, as previously explained, permit comparison so that practically all of the important variable factors involved in the heat-treatment may be determined from an individual record, or from a comparison of the two.

An important practical advantage of our method over the test-sample method in conjunction with a neutral body previously described, is that the temperature difference curve has a more pronounced "hump" for indicating a transformation period when the temperature difference is that between the temperature of the source of heat, which has relatively great thermal capacity, and the temperature of the metal. In other words, the presence of a neutral body in heat transfer relation to the steel sample, as where the steel sample is disposed within a recess of the neutral body, tends to diminish the temperature difference or gradient existing between these members and to therefore render this method less sensitive. Furthermore, due to the fact that in the neutral-body method it is necessary to test individual samples before proceeding with the heat treatment on a quantity production, it follows that considerably more time is required than in our method wherein the entire batch to be treated may be introduced into a furnace or the like without previous analysis or testing.

The above described method, by way of example, is particularly well suited for determining the critical periods in the case and in the core of case-carburized work. As is well known, the carbon content of the case and core are different from each other, and accordingly they will have different critical points or ranges.

The above method is also particularly suited for determining the critical points or ranges of small pieces, due to the sensitive measurement of the critical point or range.

Since, as previously described, it is possible to effect comparatively close control with respect to the transformation point $AC_3$, which indicates a large volume change in the work, distortion and the like of the work may be substantially eliminated, thereby greatly increasing the efficiency and economy of the treating operation.

Although the furnace structure, by way of example, is illustrated as heated by electrical resistors, it shall be understood that any other well known methods of applying heat to furnace structure may be utilized.

It shall be further understood that an arrangement of multiple temperature responsive devices, as thermo-couples, may be employed, as in the Martin Patent No. 1,550,272, August 18, 1925, to increase the sensivity or range of the means responsive to temperatures of the source and/or work. Accordingly, the appended claims shall not be interpreted as limiting the use of temperature-responsive means associated with the source or work to a single thermo-responsive device or themo-couple.

This application is a continuation in part of our copending application, Serial No. 345,766, filed March 9, 1929 upon which has issued Letters Patent 1,815,061, July 21, 1931.

What we claim is:—

1. A system for determining a critical period or periods through which a metal passes during heating, comprising a source of heat, means for supplying heat producing energy to said source at a substantially uniform rate, a heating chamber supplied by heat from said source and within which metal to be treated is disposed, thermocouples disposed adjacent and responsive solely to the temperatures of said source and metal respectively, a chart, means for moving said chart at a uniform rate, means periodically rendering the electro-motive-forces produced by said thermo-couples in opposition, and means actuated by the resultant electro-motive-force for recording upon said uniformly moving chart a record representative of the difference between the temperatures of said source and said metal.

2. A system comprising a source of heat, a chart, means for moving said chart at a uniform rate, thermo-responsive means related to said source of heat, second thermo-responsive means responsive solely to the temperature of heat-receiving material, means correlating said first and second thermo-responsive means for producing a record representative of the difference in temperatures of said source and said material on said uniformly moving chart, and means for producing a record representative of the temperature of said material on said chart in coexisting relation to said first-named record.

3. In a system of heat treatment, the method which comprises heating a mass of metal to be treated and whose transformation points are undetermined, the heating being effected by a source of heat, supplying heat producing energy to said source at a substantially uniform rate simultaneously to increase the temperatures of said source and said mass of metal, causing the heat from the mass to produce an effect varying solely with the temperature of said mass, causing the heat from the source to produce an effect varying solely with the temperature of said source, and continually comparing the differences in magnitudes of said effects with respect to time accurately to determine the occurrence of a transformation period or periods during the heating of said metal for heat treatment.

4. In a system of heat treatment, the method which comprises heating a mass of metal to be treated and whose transformation points are undetermined, the heating being effected by a source of heat of relatively great thermal capacity, supplying heat producing energy to said source at a substantially uniform rate simultaneously to increase the temperatures of said source and said mass of metal, causing the heat from the mass to produce a thermo-electric effect varying solely with the temperature of said mass, causing the heat from the source to produce a thermo-electric effect varying solely with the temperature of said source, and comparing the difference in magnitudes of said thermo-electric effects to determine, during the heating of said metal for heat treatment, the occurrence of a transformation period or periods.

5. In a system of heat treatment, the method which comprises heating a batch of metal articles to be treated, the heating being effected by a source of heat and the transformation points of said metal being undetermined, supplying heat energy to said source at a substantially uniform rate simultaneously to increase the temperatures of said source and said batch, causing the heat from the batch to produce an electromotive force varying solely with the temperature of said batch, causing the heat from the source to produce an electromotive force varying solely with the temperature of said source, opposing said electromotive forces to produce an effect whose magnitude changes abruptly as said batch passes through a transformation period, and subsequently cooling said batch at a desired rate.

6. In a system of heat treatment for steel or the like, the method which comprises heating a batch of steel, whose transformation points are undetermined, heating being effected by a source of heat, supplying heat producing energy to said source at a substantially uniform rate simultaneously to increase the temperatures of said source and of said batch of steel, causing the heat from the batch to produce an electromotive force varying solely with the temperature of said batch, causing the heat from the source to produce an electromotive force varying solely with the temperature of said source, and alternately recording the magnitude of said first electromotive force and the difference of said electromotive forces to determine during the heating of the batch for heat treatment when and at what temperature the steel is passing through a transformation period.

7. A heat-treating system comprising a heat-treating furnace, a source of heat for said furnace, a heating chamber in said furnace within which metal to be treated is disposed, means for supplying heat producing energy at a substantially uniform rate to said source, means responsive solely to the temperature of work in said chamber, independent means responsive solely to the temperature of said source, and means for differentially correlating said responsive means to determine during the heating of said metal for treatment, when said metal passes through a critical period.

8. A heat-treating system comprising a source of heat, a chamber for receiving heat from said source and for containing a batch of metal objects, means for supplying heat producing energy at a substantially constant rate to said source, thermo-electric means responsive solely to the temperature of the batch, thermo-electric means responsive solely to the temperature of said source, and means for differentially correlating said means to determine during heating of said batch when the metal passes through a transformation point.

9. A heat-treating system comprising a source of heat, a chamber for receiving heat from said source and for containing a batch of metal objects, means for supplying heat producing energy at a substantially constant rate to said source, means responsive solely to the temperature of the batch, means responsive solely to the temperature of said source, a recorder, and means for alternately associating with said recorder said first responsive means and both of said responsive means in differential relation.

10. A heat-treating system comprising a source of heat, a heating chamber for containing a batch of metal objects, means for supplying heat producing energy at a substantially constant rate to said source, thermocouple structure adjacent said batch for response solely to change in temperature thereof, thermocouple structure responsive solely to change in temperature of said source, means for periodically connecting said thermocouples in series opposition to produce a differential voltage, a chart, means for moving said chart at a uniform rate, and means actuated by said differential voltage for producing a record of the temperature difference between said batch and said source of heat.

JOHN W. HARSCH.
WILLIAM R. SCHOFIELD, Jr.